US011063740B1

(12) United States Patent
Cingoz et al.

(10) Patent No.: US 11,063,740 B1
(45) Date of Patent: Jul. 13, 2021

(54) TWO-WAY OPTICAL TIME TRANSFER USING A PHOTONIC CHIP

(71) Applicant: Vector Atomic, Inc., Pleasanton, CA (US)

(72) Inventors: Arman Cingoz, Pleasanton, CA (US); Abijith Sudarsan Kowligy, Pleasanton, CA (US); Jonathan David Roslund, Pleasanton, CA (US)

(73) Assignee: VECTOR ATOMIC, INC., Pleasanton, CA (US)

( * ) Notice: Subject to any disclaimer, the term of this patent is extended or adjusted under 35 U.S.C. 154(b) by 0 days.

(21) Appl. No.: 16/942,357

(22) Filed: Jul. 29, 2020

(51) Int. Cl.
*H04B 10/00* (2013.01)
*H04L 7/00* (2006.01)
*G02B 6/42* (2006.01)
*H04J 14/02* (2006.01)
*H04J 14/00* (2006.01)

(52) U.S. Cl.
CPC .............. *H04L 7/0075* (2013.01); *G02B 6/42* (2013.01); *H04J 14/02* (2013.01)

(58) Field of Classification Search
CPC ... H04B 10/11; H04B 10/112; H04B 10/1123; H04B 10/1125; H04B 10/1129; H04L 7/0075
See application file for complete search history.

(56) References Cited

U.S. PATENT DOCUMENTS

2018/0294946 A1* 10/2018 Sinclair ................ H04B 10/112
2018/0317184 A1* 11/2018 Bushnell ............. H04W 56/001

OTHER PUBLICATIONS

Giorgetta, F. R. et al. Optical two-way time and frequency transfer over free space. Nature Photonics 7, 434-438 (2013).
Deschênes, J.-D. et al. Synchronization of Distant Optical Clocks at the Femtosecond Level. Phys. Rev. X 6, 021016 (2016).
Sinclair, L. C. et al. Optical system design for femtosecond-level synchronization of clocks. in Proc. SPIE 9763, Slow Light, Fast Light, and Opto-Atomic Precision Metrology IX (eds. Shahriar, S. M. & Scheuer, J.) 976308 (2016). doi:10.1117/12.2220191.
Bergeron, H. et al. Tight real-time synchronization of a microwave clock to an optical clock across a turbulent air path. Optica, Optica 3, 441-447 (2016).
Bauters, J. et al. Ulta-low-loss high-aspect-ratio Si3N4 waveguides. Optics Express 19, 3163 (2011).

* cited by examiner

*Primary Examiner* — Daniel G Dobson
(74) *Attorney, Agent, or Firm* — Patterson + Sheridan, LLP (57) ABSTRACT

Embodiments herein describe sub-picosecond accurate two-way clock synchronization by optically combining received optical pulses with optical pulses generated locally in a photonic chip before the optical signals are then detected by a photodetector to obtain an interference measurement. That is, the optical pulses can have different repetition rates so that the offset between the received and local optical pulses constantly changes, thereby resulting in different interference measurements. Optically combining the pulses in the photonic chip avoids much of the jitter introduced by the electronics. Further, the sites can obtain multiple interference measurements which can be evaluated to accurately determine when the optical pulses arrive at the site with femtosecond accuracy.

21 Claims, 7 Drawing Sheets

TWO-WAY OPTICAL TIME TRANSFER USING A PHOTONIC CHIP

BACKGROUND

Two-way optical time transfer involves two sites or two vehicles exchanging optical pulses with predefined repetition rates. Determining when the pulses arrive at each site enable the sites to extract timing deviation (if any) between the respective clocks and perform clock synchronization. In a simplistic example, each site can include a photodetector for detecting when the optical pulses transmitted by the other site arrives. However, jitter in the electronics does not allow the sites to determine the pulse arrival time with an accuracy greater than a picosecond. That is, the electronics distort the converted optical pulse which makes it difficult to accurately determine (e.g., with an accuracy greater than a picosecond) when the center of the pulses arrive. In many clock synchronization systems, greater accuracy is desired (e.g., femtosecond accuracy) between the clocks at the sites.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

SUMMARY

One embodiment presented in this disclosure is a photonic chip that includes a first optical interface for receiving a first pulse train from an external source where the external source comprises a remote clock, wherein pulses in the first pulse train have a first repetition rate, a second optical interface configured to receive a second pulse train having pulses with a second repetition rate different from the first repetition rate, a first optical combiner coupled to the optical interface and the second optical interface where the first optical combiner is configured to combine the first pulse train and the second pulse train into a combined optical signal, and a third optical interface configured to output the combined optical signal onto a photodetector to generate interference measurements between pulses in the first and second pulse trains for synchronizing a local clock to the remote clock.

Another embodiment presented in this disclosure is a method that includes receiving, at a photonic chip, a first pulse train from an external source, wherein the external source comprises a remote clock where pulses in the first pulse train have a first repetition rate, receiving, at the photonic chip, a second pulse train having pulses with a second repetition rate different from the first repetition rate, optically combining the first pulse train and the second pulse train into a combined optical signal in the photonic chip, and outputting the combined optical signal onto a photodetector to generate interference measurements between pulses in the first and second pulse trains for synchronizing a local clock to the remote clock.

Another embodiment presented in this disclosure is a first clock, a pulsed optical source configured to generate a first pulse train with pulses having a first repetition rate, and a photonic chip optically coupled to the pulsed optical source where the photonic chip is configured to receive and combine the first pulse train with a second pulse train received from an external clock system in order to synchronize the first clock with a second clock in the external clock system, wherein the second pulse train has pulses with a second repetition rate different from the first repetition rate.

DETAILED DESCRIPTION

Embodiments herein describe sub-picosecond accurate two-way clock synchronization by optically combining received optical pulses with optical pulses generated locally before the optical signals are then detected by a photodetector to obtain an interference measurement. That is, the optical pulses can have different repetition rates so that the offset between the received and local optical pulses constantly changes, thereby resulting in different interference measurements. Optically combining the pulses avoids much of the jitter introduced by the electronics. Further, the sites can obtain multiple interference measurements which can be evaluated to accurately determine when the optical pulses arrive at the site with femtosecond accuracy.

However, combining the received optical pulses with the local optical pulses is very difficult to accomplish using discrete optical components such as fiber optical cable and bulk optical components. Small differences in the optical paths traversed by the received optical pulses and the local optical pulses can prevent the system from performing clock synchronization with sub-picosecond accuracy. Moreover, the ultrashort pulses (sub-picosecond) often used in this technique are sensitive to optical dispersion in optical fibers, which can lead to pulse distortions that affect the timing deviation, especially if there is large relative platform motion between the two sites as is the case in a synchronization situation between a ground-based master site and a satellite clock. This issue is exasperated by long lengths of optical fiber, which may require optical dispersion compensation using specialty small core fiber that is hard to fusion splice to ordinary fiber and leads to additional insertion loss and complication in the system. Even further, the optical path lengths in optical fiber are quite sensitive to temperature fluctuations, and as a result, the system requires careful architectural design choices to minimize fiber paths that are not common to the optical paths of the received and local optical pulses, keeping these out-of-loop fiber lengths as short as possible which makes fusion splicing challenging, and requires large temperature stabilizing housings, which drives the power consumption of the system.

Embodiments herein use a photonic chip (or a photonic integrated circuit) to replace much of the fiber optical cable and bulk optical components discussed above. Instead of a large housing (e.g., 1 liter size container), the optical cable and bulk optical components can be implemented using waveguides and optical devices in a photonic chip with width and length dimensions of a few centimeters. Advantageously, the optical paths discussed above are lithographically defined with sub-micron precision and can be mass produced with little to no labor costs. Further, the out-of-loop optical path sections can be implemented using waveguides in the photonic chip that are a centimeter or less in length, which improves the temperature dependency of the system. Because of the size of the photonic chip, temperature control of the critical sections of the optical system is a much easier task that requires less power. Further, reducing the footprint of the optical system allows for moving the system close to transmitter/receiver telescopes used to transmit and receive the optical pulses to the other site thereby reducing the length of optical fiber and the associated dispersion problems.

Figure 1:
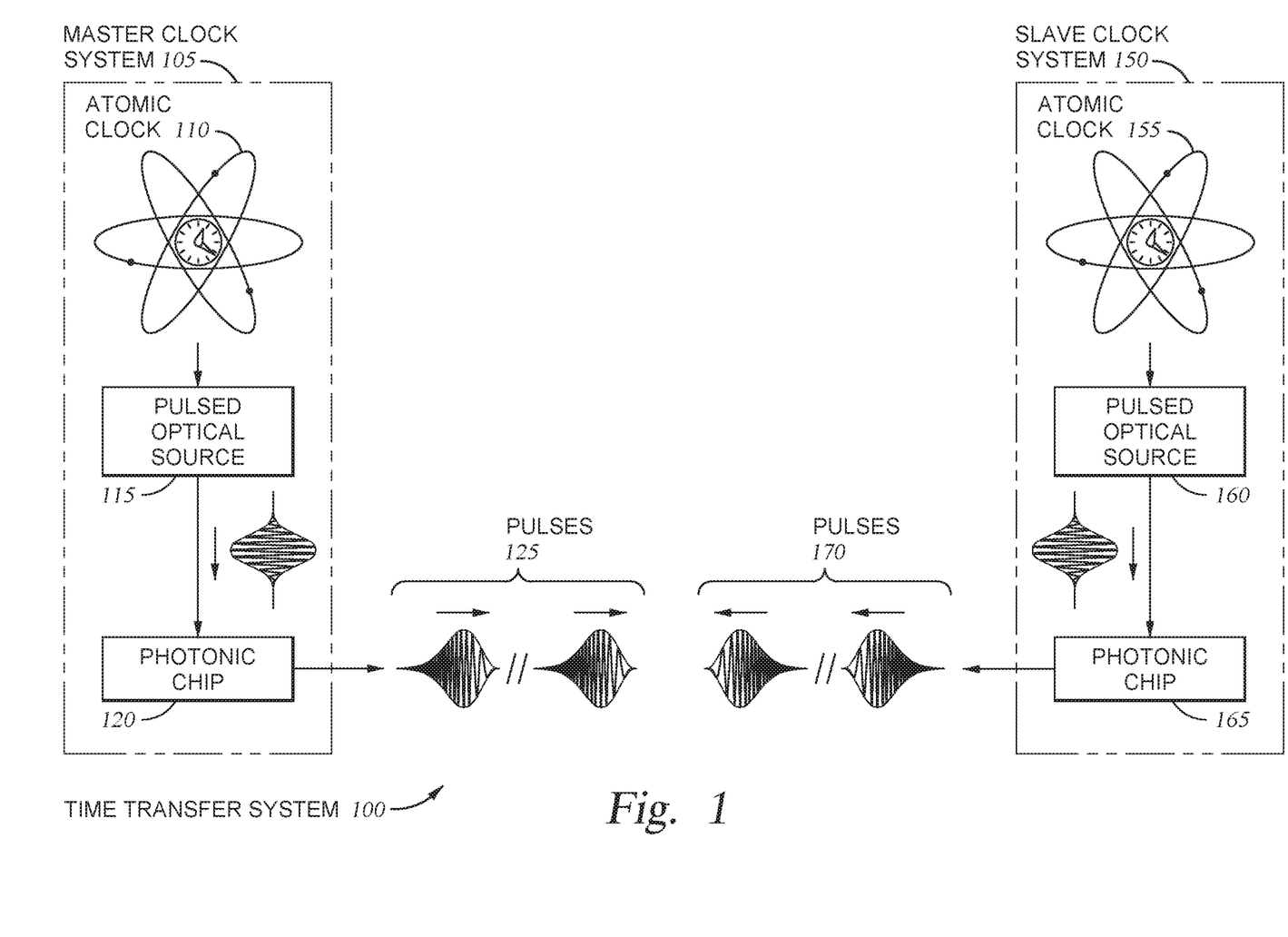
FIG. 1 illustrates a two-way optical time transfer system that uses photonic chips, in one embodiment described herein.

FIG. 1 illustrates a two-way optical time transfer system 100 that uses photonic chips, in one embodiment described herein. The system 100 includes a master clock system 105 and a slave clock system 150 that are disposed at different geographic locations but are in optical communication (e.g., line of sight (LOS)) with each other. For example, the master clock system 105 may be disposed at a first location on the earth's surface while the slave clock system 150 is disposed at a second, different location on the earth's surface that is within LOS of the first location. In another embodiment, one of the master clock system 105 or the slave clock system 150 is disposed at a stationary location on the earth's surface while the other clock system is disposed on a moving vehicle—e.g., a ground vehicle or a flying vehicle such as a plane, drone, or satellite. In yet another embodiment, both the master clock system 105 and the slave clock system 150 may be disposed on moving platforms such as a car and a plane, two planes, two satellites, one plane and one satellite, etc.

The master clock system 105 includes an atomic clock 110, a pulse optical source 115, and a photonic chip 165. While an atomic clock 110 is shown, the master clock system 105 can use any kind of high precision clock. The atomic clock 110 generates a signal that the pulsed optical source 115 uses to generate an optical pulse train which is then transmitted to the photonic chip 120. Because this optical pulse train is generated at the master clock system 105, it is referred to as a local optical pulse train. Further, the pulsed optical source 115 may be referred to as a frequency comb.

The photonic chip 120 receives the local optical pulse train from the pulsed optical source 115 and transmits optical pulses 125 to the slave clock system 150. Although not shown, the master clock system 105 can include a telescope or other optical interface from transmitting the pulses 125 to the slave clock system 150 in free space. In addition to transmitting the optical pulses 125 to the slave clock system 150, the master clock system 105 receives optical pulses 170 from the slave clock system 150. Because these pulses 170 are generated by an external system (i.e., the slave clock system 150), the optical pulses 170 are referred to as received optical pulse relative to the master clock system 105. However, these designations would be reversed for the slave clock system 150 where the optical pulses 125 would be the received optical pulses while the pulses 170 are local optical pulses.

As described in more detail below, the photonic chip 120 optically combines the received optical pulses 170 with the locally generated optical pulses 125. The photonic chip can then direct the combined optical signal to a photodetector which measures interference between the pulses 125 and 170. This interference can be used to identify a deviation between the atomic clock 110 in the master clock system 105 and an atomic clock 155 in the slave clock system 150 so that the clocks can be synchronized with sub-picosecond accuracy.

Like the master clock system 105, the slave clock system 150 includes an atomic clock 155, a pulsed optical source 160, and photonic chip 165, which perform similar functions as discussed above. That is, the photonic chip 165 combines the pulses 125 received from the master clock system 105 with the locally generated pulses 170 to identify interference measurements indicative of a deviation between the atomic clocks 110, 155. In one embodiment, the master and slave clock systems 105, 150 exchange information using an off-band communication system (e.g., a coarse communication laser) to determine how to adjust one or both of the clocks 110, 155 so they are synchronized and to account for any change in separation distance between the systems 105, 150.

Figure 2:
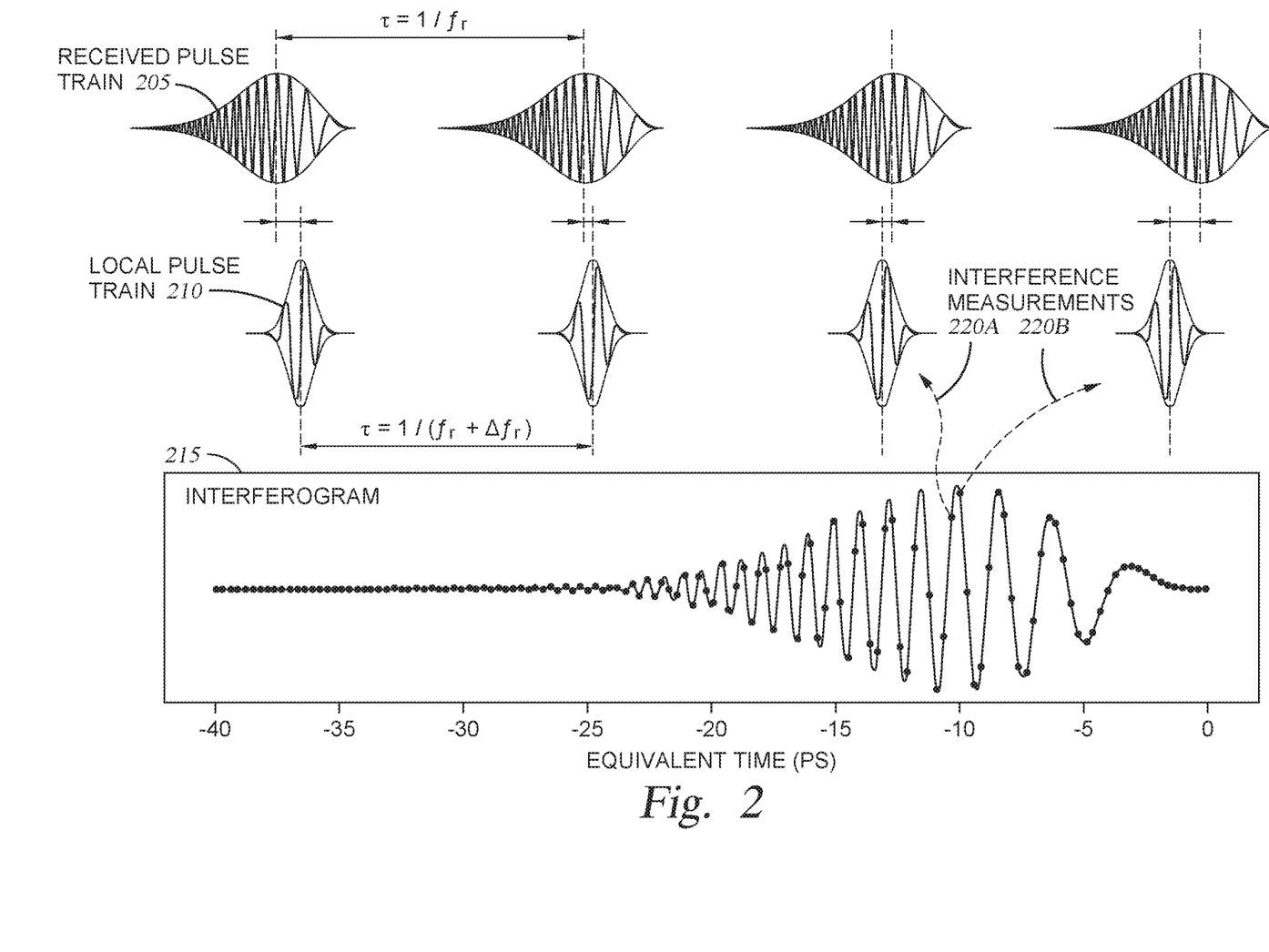
FIG. 2 illustrates obtaining interference measurements between received and local optical pulses trains with different repetition rates, in one embodiment described herein.

FIG. 2 illustrates obtaining interference measurements between a received optical pulse train 205 and a local optical pulse train 210 with different repetition rates, in one embodiment described herein. The technique illustrated in FIG. 2 may be performed simultaneously at both the master and slave clock systems. Specifically, the technique may be performed in the photonic chips 120 and 165 in parallel.

In FIG. 2, the received pulse train 205 has a different repetition rate than the local pulse train 210. The time interval between each of the pulses in the received pulse train 205 is defined by:

$$\tau = 1/f_r \qquad (1)$$

The time interval between each of the pulses in the local pulse train 210 is defined by:

$$\tau = \frac{1}{(f_r + \Delta f_r)} \qquad (2)$$

In this example, $\Delta f_r$ represents the difference between the repetition rates. For example, the repetition rate $f_r$ for the received pulse train may be approximately 200 MHz while the $\Delta f_r$ is less than 10 kHz (e.g., around 2 kHz) which results in the local pulse train 210 having a slightly faster repetition rate. This small difference between the repetition rates results in the pulses of the local pulse train 210 walking through the pulses of the received pulse train 205. This is illustrated by the vertical dotted lines in FIG. 2 which, when moving from left to right, show that the center of the pulses of the local pulse train 210 are to the right of the center of the pulses of the received pulse train 205 but then this offset changes such that the center of the pulses of the local pulse train 210 is to the left of the center of the pulses of the received pulse train 205.

As mentioned above, the receiver pulse train 205 and the local pulse train 210 are combined optically in the photonic chips. When doing so, if the pulses are temporarily overlapping (i.e., overlapping in time), they interfere with each other, either constructively or destructively. If no portion of the pulses overlap temporarily, then the interference measurement is essentially zero.

An interferogram 215 illustrates a plurality of interference measurements captured by a photodetector over time. The flat portion of the interferogram 215 indicates a time when the different pulses of the trains 205, 210 arrived at the photonic chip at different times such that the respective pulses did not overlap, and thus, there was no interference. However, the sinusoidal portion of the plot in the interferogram 215 is formed by interference measurements captured when at least a portion of the pulses in the trains 205, 210 overlapped. For example, the interference measurements 220A and 220B represent two points (or data samples) in the interferogram 215 where the pulses of the trains 205, 210 overlapped, thereby resulting in non-zero interference values. In one embodiment, optically combining the pulse trains 205, 210 and then measuring a respective electrical signal representing the interference between two (at least partially) overlapping pulses is referred to as downsampling.

In one embodiment, the plurality of measurements or data samples illustrated in the interferogram 215 may be processed as a whole to identify a deviation between the master and slave clock systems. For example, the systems may capture thousands of individual interference measurements before processing the data to identify a clock deviation. In that scenario, the systems perform a tradeoff between the frequency at which synchronization is performed with improved accuracy. For example, the systems may perform synchronization every 1-1000 microseconds using a plurality of interference measurements collected over that time period. Where the repetition rate f is 200 MHz and the difference $\Delta f_r$ is 2 kHz, the equivalent timing step (sampling resolution) is given by $\Delta f_r/f^2 \sim 50$ fs per step, and the entire interferogram 215 repeats every $1/\Delta f_r \sim 500$ μs, which is the minimum data acquisition time to recover the timing offset and sets the synchronization bandwidth. Doing so enables the system to determine with improved accuracy (e.g., with femtosecond accuracy) the time a center of the optical pulses in the received pulse train 205 arrives.

In FIG. 2, the widths of the pulses in the received pulse train 205 are wider than the widths of the pulses in the local pulse train 210 which indicates the dispersion experienced by the received pulse train 205 when propagating from one clock system to the other. However, this difference in widths is exaggerated in FIG. 2. After the local pulse train 210 is transmitted to the other clock system, the width of those pulse may be stretched out similar to the pulses of the received pulse train 205. In any case, this dispersion has little or no impact on the accuracy of the synchronization system since the master and slave clock systems detect when the center of the pulses arrive. More specifically, the technique illustrated in FIG. 2 can tolerate numerous optical link dropouts and is not particularly sensitive to the actual pulse shape of the optical pulses.

Figure 3:
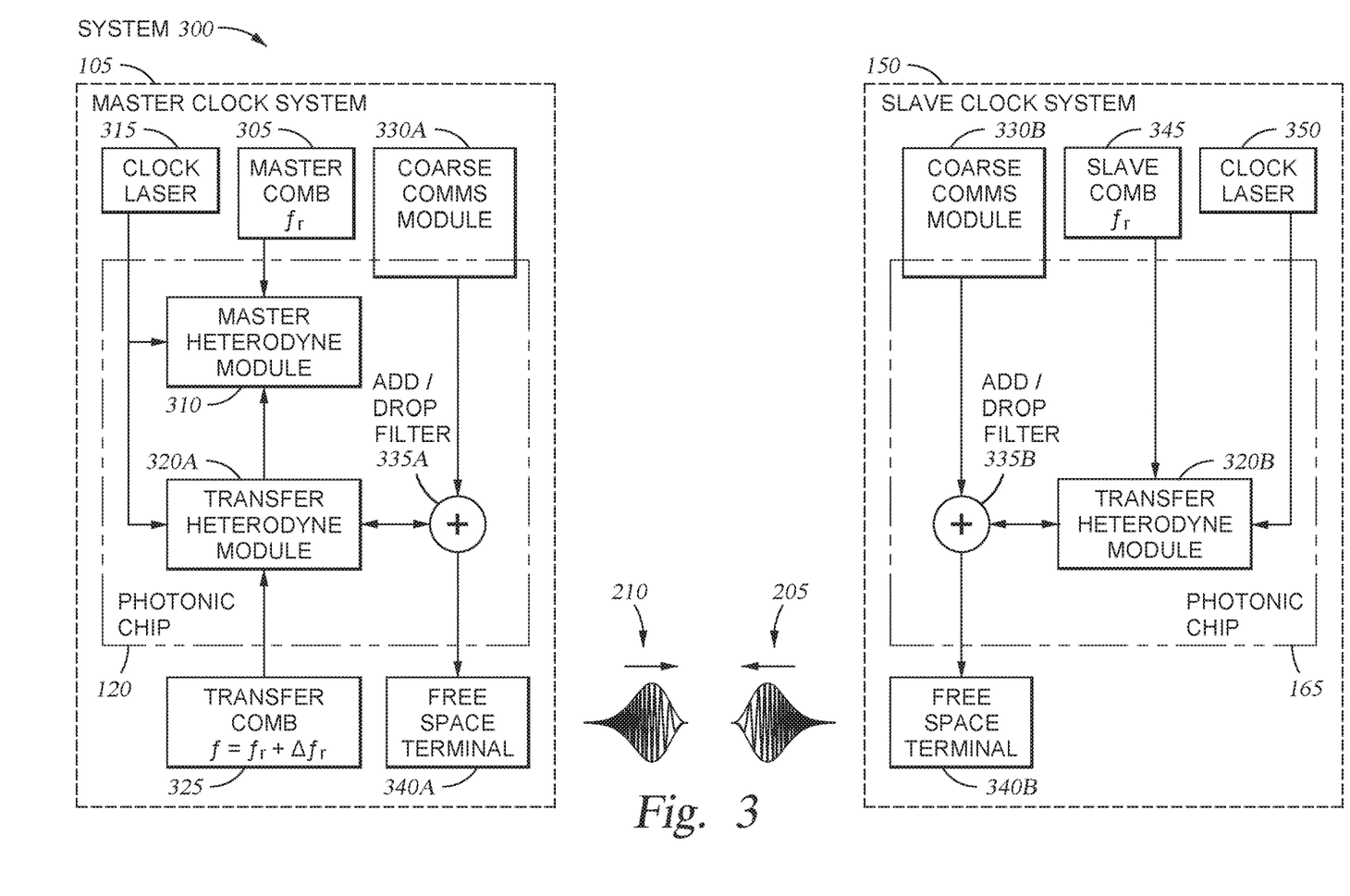
FIG. 3 is block diagram of a two-way optical time transfer system that uses photonic chips, in one embodiment described herein.

FIG. 3 is block diagram of a two-way optical time transfer system 300 that uses photonic chips, in one embodiment described herein. As shown, the system 300 includes the master clock system 105 and the slave clock system 150, but has more detail than in FIG. 1.

The master clock system 105, includes a clock laser 315 which is generated using the output of the high precision clock (not shown) such as an atomic clock. The output of the clock laser 315 is transmitted to a master heterodyne module 310 and a transfer heterodyne module 320A. In general, the master heterodyne module 310 uses the inputs shown in FIG. 3 to output an electrical clock signal or RF clock signal (not shown) that is used as a clock signal for the electrical components in the master clock system 105. A master comb 305 (e.g., a pulsed optical source) provides an optical signal (e.g., an optical pulse train) with a repetition rate of $f_r$ (e.g., 100 MHz or 200 MHz). As described in more detail below, the optical signal received from the master comb 305 is compared to an optical pulse train received from the transfer heterodyne module 320A and compared to the clock laser 315. This enables the master heterodyne module 310 to generate an electrical clock signal synchronized to the high precision clock in the master clock system 105, as well as synchronize the transfer heterodyne module to the master heterodyne module.

The transfer heterodyne module 320A, in contrast, generates the local optical pulse train 210 which is then transmitted to the slave clock system 150. To do so, the transfer heterodyne module receives an optical pulse train from a transfer comb 325 (e.g., a pulsed optical source) that has a repetition rate of $f_r + \Delta f_r$ (e.g., a repetition rate that is slightly greater than or less than the repetition rate $f_r$ used by the master comb 305). The transfer heterodyne module 320A also receives the optical signal generated by the clock laser 315 so that the transfer comb can remain synchronized to the high precision clock.

The transfer heterodyne module 320A outputs the local pulse train 210 to an add/drop filter 335A which combines the optical pulse train 210 with an optical signal generated by a coarse communication module 330A. In one embodiment, the coarse communication module 330A (and the corresponding module 330B in the slave clock system 150) perform a coarse synchronization between the master and slave clock systems 105, 150. For example, using the coarse communication modules 330, the master and slave clock system 105, 150 may exchange pulse numbers and learned clock deviation values so that the high precision clocks can be synchronized. Unlike the optical pulse train 210 which is a series of optical pulses, the optical signal generated by the coarse communication module 330A may be a modulated optical signal that transmits data. Further, this optical signal may be at a different wavelength than the local pulse train 210 output by the transfer heterodyne module 320A. That way, the optical signals can occupy the same optical paths with minimum interference. However, in another embodiment, the optical signal generated by the coarse communication module 330A is transmitted to the slave clock system 150 using a different optical path or channel. Further, while in FIG. 3, the pulse train 210 is referred to as the local pulse train and the pulse train 205 is referred to as the received pulse train, this designation is relative to the perspective of the master clock system 105 and would be reversed relative to the perspective of the slave clock system 150.

The add/drop filter 335A transmits the optical signals generated by the transfer heterodyne module 320A and the coarse communication system 330A to a free space terminal 340A which serves as an optical interface between the two systems 105, 150. For example, the free space terminal 340A may include a telescope or focusing element to direct the optical signal towards the system 150. Further, if one or both of the master and slave clock systems 105, 150 are mounted on a moving platform, the free space terminal 340A may include a moveable apparatus to track the slave clock system 150 so that the master clock system 105 can continue to exchange optical signals with the slave clock system 150.

In FIG. 3, the free space terminal 340A receives the optical pulse train 205 (i.e., the received optical pulse train 205) generated by the slave clock system 150. The add/drop filter 335A can separate the received optical pulse train 205 from any coarse communication optical signal received from the slave clock system 150. That is, the add/drop filter 335A can forward the received pulse train 205 to the transfer heterodyne module 320A and the received coarse communication optical signal to the coarse communication module 330A.

As described above in FIG. 2, the transfer heterodyne module 320A optically combines the locally generated pulse train 210 with the received pulse train 205. Using a photodetector, the master clock system 105 can measure the optical interference between the overlapping pulses in the trains 205, 210. These measurements (or an analysis of these measurements) can then be exchanged with the slave clock system 150 using the optical signals generated by the coarse communication module 330A.

The slave clock system 150 has several of the same components as the master clock system 105. Notably, the slave clock system 150 includes a transfer heterodyne module 320B, add/drop filter 335B, a coarse communication module 330B, and a free space terminal 340B which perform similar functions as described above. The slave clock system 150 also includes a clock laser 350 and a slave comb 345. In one embodiment, the clock laser 350 in the slave clock system 150 is stabilized to a cavity of the laser, while the clock laser 315 in the master clock system 105 is stabilized to an atomic reference corresponding to an atomic clock. However, there are many options for the clock lasers 350 and 315. For example, the master clock system 105 may have a cavity to pre-stabilize the laser while the slave clock system 150 has a similar setup. Or the slave clock system 150 may have a simpler setup than the master clock system 105 with only an atomic reference or only a cavity. In any case, the clock laser generates an optical signal that is received by the transfer heterodyne module 320B so that this module 320B remains synchronized to the high precision clock in the slave clock system 150.

In addition, the transfer heterodyne module 320B receives an optical pulse train from a slave comb 345 (e.g., a pulsed optical source) with a repetition rate of $f_r$. In response, the transfer heterodyne module 320B outputs the optical pulse train 205 to the master clock system 105. Thus, while the transfer heterodyne module 320A on the master clock system 105 transmits the optical pulse train 210 with a repetition rate of $f_r+\Delta f_r$, the transfer heterodyne module 320B on the slave clock system 150 transmits the optical pulse train 205 with a repetition rate of $f_r$. Thus, optically combining these two pulse trains 205, 210 in both of the transfer heterodyne modules 320A and 320B results in the pulses walking through each other as illustrated in FIG. 2. The transfer heterodyne modules 320A and 320B can, in parallel, generate interference measurements between respective pulses and exchange this information with each using the coarse communication modules 330A and 330B. One advantage of capturing interference measurements at both the master and slave clock systems 105, 150 is that doing so makes it easy to compensate for any change in the separation distance between the systems 105, 150. Because a change in separation distances affects both optical pulse trains 205, 210 in the same way, any timing deviation resulting from a change in separation distance can be removed by subtracting the deviation values measured by the master and slave clock systems 105, 150, thereby leaving only the deviation resulting from clock drift. This information resulting from performing a two-way time transfer can then be used to resynchronize the high precision clocks on the master and slaved clock systems 105, 150.

FIG. 3 illustrates different components and modules in the master and slave clock systems 105, 150 that are implemented within the photonic chips 120 and 165. In the master clock system 105, the master heterodyne module 310, the transfer heterodyne module 320A, the add/drop filter 335A and a part of the coarse communication module 330A are in the photonic chip 120. In the slave clock system 150, the transfer heterodyne module 320B, the add/drop filter 335B and a part of the coarse communication module 330B are in the photonic chip 165. The details for implementing the components in the photonic chips 120, 165 are described below. Doing so has many non-limiting advantages. For instance, the optical paths corresponding to these components are lithographically defined with sub-micron precision in the photonic chips 120, 165 and can be mass produced with little to no labor costs. Further, out-of-loop optical path sections (i.e., where the optical paths for the locally generated pulse train 205 and the received pulse train 210 are not in common) can be implemented using waveguides in the photonic chips 120, 165 that are a centimeter or less in length, which improves the temperature dependency of the system. Moreover, because of the size of the photonic chips 120, 165, temperature control of the critical sections of the optical system is a much easier task that requires less power. Further, reducing the footprint of the optical system allows for moving the system close to transmitter/receiver telescopes in the free space terminals 340A and 340B used to transmit and receive the optical pulses which reduces the length of optical fiber and the associated dispersion problems.

Figure 4:
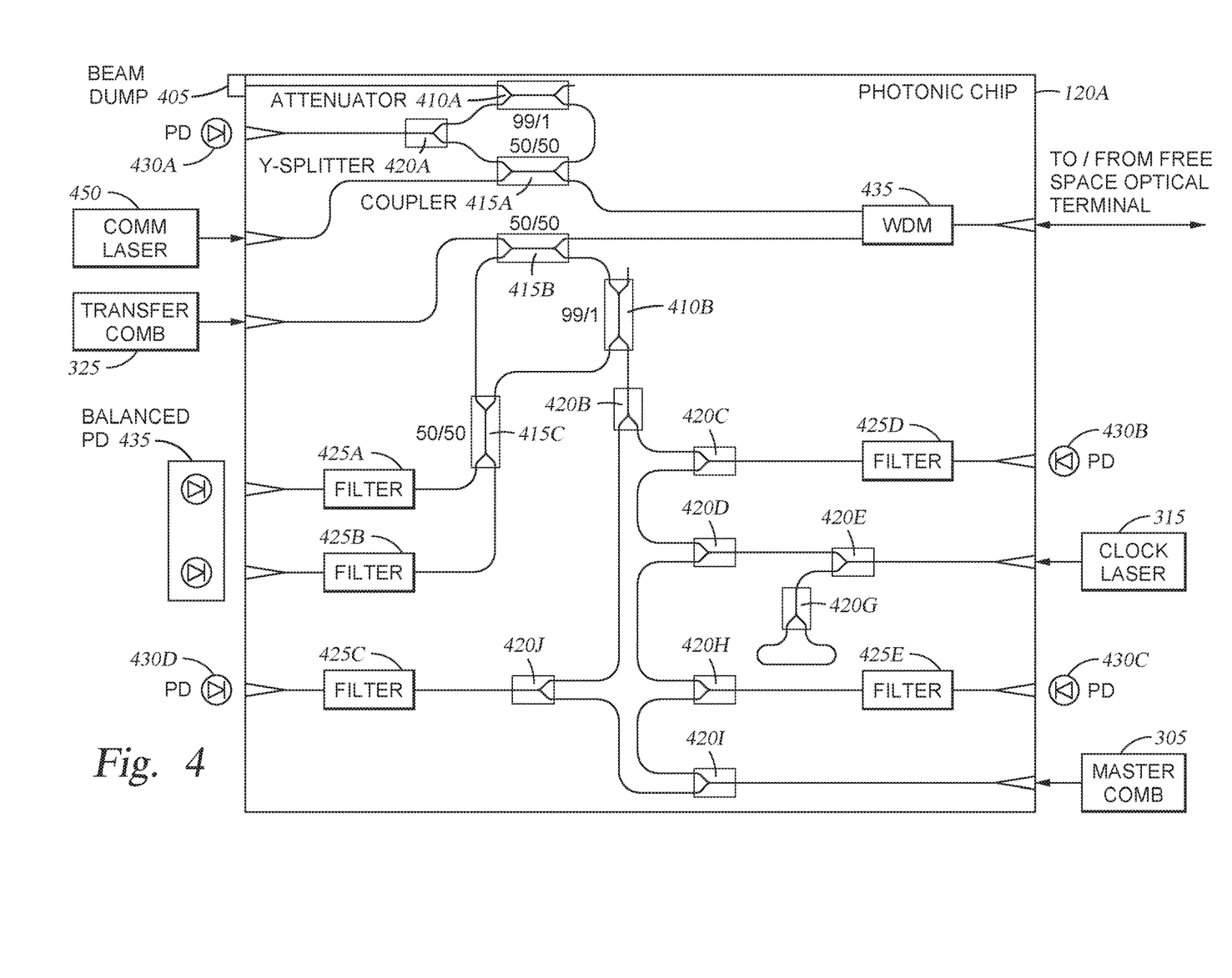
FIG. 4 is a photonic chip used in a two-way optical time transfer system, in one embodiment described herein.

FIG. 4 is a photonic chip 120A used in a two-way optical time transfer system, in one embodiment described herein. In one embodiment, the photonic chip 120A is used in the master clock system 105 discussed above. Also, the photonic chip 120A can be used in the slave clock system 150, but some of the components may be unused. Thus, the same chip design can be used in both systems if desired. Alternatively, a simplified version of the photonic chip 120A in FIG. 4 can be used for the slave clock system.

Starting from the top, the photonic chip 120A includes a beam dump 405, attenuator 410A, a Y-splitter 420A, coupler 415A, and wavelength division multiplexer (WDM) 435 for transmitting and receiving optical pulse trains and the optical signals used by the coarse communication module. First addressing the coarse communication module, the photonic chip 120A receives a communication (Comm) laser 450 generated by the coarse communication module. As discussed above, the optical signal generated by the communication laser 450 may be data signal and may have a different wavelength (or range of wavelengths) than the pulse train. The photonic chip 120A uses a waveguide to couple the comm laser 450 to the coupler 415A which forwards one half of the optical signal (e.g., half its power) to the WDM 435 and the other half of the optical signal to the attenuator 410A. The attenuator 410A reduces the received power of the comm laser 450 by a ratio of 99/1 where 1% of the power is forwarded to the Y-splitter 420A and the remaining portion of the optical signal is dumped (i.e., ignored).

In parallel, the WDM 435 can receive a coarse communication optical signal and an optical pulse train from the slave clock system via the free space optical terminal. The WDM 435 separates the coarse communication optical signal from the optical pulse train (which are transmitted using different wavelengths) such that the coarse communication optical signal is forwarded to the coupler 415A while the received pulse train is forwarded to a coupler 415B.

The coupler 415A forwards the received coarse communication optical signal to the Y-splitter 420A where it is combined with the attenuated version of the coarse communication optical signal output by the attenuator 410A as discussed above. Because the locally generated coarse communication optical signal is a high power optical signal intended for free space communication, attenuating its power ensures it does not saturate a photodetector 430A and has similar power as the received coarse communication optical signal which has already traversed the free space optical link between the master and slave clock systems. The Y-splitter 420A combines the locally generated and received coarse communication signals which are then detected by the PD 430A. In this example, the attenuator 410A, the Y-splitter 420A, the coupler 415A, the WDM 435, and the beam dump 405 can form the add/drop filter 335A and a part of the coarse communication module 330A illustrated in FIG. 3.

Turning now to the received optical pulse train, the WDM 435 forwards this optical signal to the coupler 415B and then to the coupler 415C. The coupler 415B also receives the locally generated optical pulse train generated by the transfer comb 325 discussed in FIG. 3. The locally generated optical pulse train has a slightly different repetition rate than the received pulse train. The coupler 415B forwards half of the locally generated pulse train to the WDM 435 where it can be combined with the locally generated coarse communication optical signal and transmitted to the slave clock system. The other half of the power of the local pulse train is forwarded to the attenuator 410B which forwards 1% of the power of the local pulse train to the coupler 415C so that the local generated pulse train does not saturate the downstream PDs in a balanced PD 435. The coupler 415C combines the attenuated local pulse train with the received local pulse train and forwards half of the power of the combined optical signal to a filter 425A and the other half of the power of the combined optical signal to a filter 425B. In one embodiment, the attenuator 410B, the coupler 415C, and the filters 425A and 425B form a transfer heterodyne module in the photonic chip 120A.

Generally, the Y-splitters and the 50/50 couplers can be considered as different types of optical combiners or optical splitters. While a Y-splitter could be used rather than the 50/50 coupler 415C to combine the two pulse trains, doing so may result in half of the optical signal being lost in the cladding. 50/50 directional couplers act identically with Y-splitters when splitting the optical power from an input source into two separate waveguides, but when used in reverse, i.e., combining optical power from two light sources, the Y-junction in the Y-splitter has a single output port and loses half the combined light into the cladding of the chip, while the 50/50 coupler preserves all of the light, but outputs them into two separate waveguides. Thus, determining whether to use a 50/50 coupler or Y-splitter is a design choice between preserving optical power of weak signals versus minimizing the optical outputs of the photonic chip 120A (which are expensive). On portions of the chip 120A where there are weak optical signals, such as the pulses received from the other clock system, the chip 120A includes 50/50 couplers and balanced photodetectors (e.g., the balanced PD 435) to utilize all the optical power. On sections where the laser sources are local to the clock system and abundant optical power is available, the chip 120A uses Y-junctions to have a single output port and use a simpler single PD, thereby reducing costs relative to using a balanced PD.

The outputs of the coupler 415C, which are the same combined optical signal but with half the power, are filtered by the filters 425A and 425B to remove any optical signals outside of the wavelengths used by the local and received pulse trains. The PDs in the balanced PD 435 then measure interference measurements indicating the amount the pulses in the local and received pulse trains interfere with each other when combined by the coupler 415C. In one embodiment, the PD 435 outputs an electrical signal (or signals) which is converted by an analog to digital converter to a digital representation of interference between two pulses. Of course, as discussed above, there are times when pulses in the two trains do not overlap due to their different repetition rates in which case the interference measurement may indicate there was no interference during those times. In this manner, the local and received pulse trains can be optically combined in the photonic chip 120A before determining an interference measurement (e.g., a digital value or values) using the balanced PD 435.

In addition to outputting an attenuated version of the local pulse train, the attenuator 410B outputs 99% of the received power to a Y-splitter 420B which is optically coupled to a Y-splitter 420J and a Y-splitter 420C so that the local pulse train can be compared to the master comb 305 and the clock laser 315. As mentioned in FIG. 3, the master comb 305 outputs a pulse train at a different repetition rate than the local pulse train generated by the transfer comb 325 (when the photonic chip 120A is part of the master clock system). The Y-splitter 420J receives the pulse train generated by the master comb 305 from the Y-splitter 420I, and combines this pulse train with the local pulse train generated by the transfer comb 325. This combined optical signal is detected by the PD 430D. Electrically circuitry (not shown) can then be used to synchronize the transfer comb 325 and the master comb 305 so they have the desired difference $\Delta f_r$ in their repetition rates.

Additionally, the pulse train generated by the transfer comb 325 is received at the Y-splitter 420C along with a portion of the optical signal output by the clock laser 315, which is generated using the high precision master clock in the master clock system. As shown, the clock laser 315 outputs an output signal to a Y-splitter 420E which splits the signal between a Y-splitter 420D and a Y-splitter 420G. The Y-splitter 420G serves as a mirror to send some portion of the signal back to the clock laser 315. Doing so is useful to improve the precision of the clock laser 315 where fluctuations in the length of the fiber connecting the clock laser 315 to the chip 120A may result in frequency shifts in the frequency of the signal (due to temperature changes, vibrations, etc.). Using the Y-splitter 420G, some portion of the signal generated by the clock laser 315 is reflected back to the source, where it is compared against itself to extract the fiber-induced frequency noise/shifts to compensate for the fiber link fluctuations.

The Y-splitter 420D forwards a portion of the clock laser 315 to the Y-splitter 420C so it can be combined with the pulse train generated by the transfer comb 325 and the remaining portion of the clock laser 315 to a Y-splitter 420H to be combined with the portion of the pulse train output by the master comb 305. These combined signals are then filtered by filters 425D and 425E, respectively, and detected by the PDs 430B and 430C. Combining the clock laser 315 with the pulse trains output by the transfer comb 325 and the master comb 305 permit the master clock to stabilize these signals to the high precision master clock using electrical circuitry (not shown) connected to the PDs 430B and 430C.

In one embodiment, the Y-splitter 420H, 420I, 420J and the filters 425C and 425E (as well as possibly other components) form the master heterodyne module in the photonic chip 120A. In this manner, the optical components in the photonic chip 120A can perform the functions of the transfer heterodyne module 320, master heterodyne module 310, the add/drop filter 335A, and a portion of the coarse communication module 330A illustrated in FIG. 3.

In one embodiment, the filters 425D and 425E may have a narrower passband than the filters 425A-C. For example, the filter 425A-C may have 10 nm pass bands while the filters 425D and 425E have approximately 1 nm pass bands because the pulses generated by the transfer comb 325 and the master comb 305 are broad so the spectral overlap of the pulses is much larger than the optical signal output by the clock laser 315.

The lines connecting the various optical components in the photonic chip 120A (e.g., the Y-splitters 420, couplers 415, and filters 425) represent waveguides through which optical signals propagate. Further, some of the waveguides terminate at edges of the chip 120A that form optical interfaces for receiving optical signals from light sources (such as the transfer comb 325, clock laser 315, master comb 305, or another external clock system) or transmitting optical signals to external devices (such as the PDs 430, the balanced PD 435, or another external clock system). These optical interfaces can include adapters that change or the mode size of the optical signals, but this is not a requirement. Further, while edge coupling is shown, in other embodiments, the waveguides may be optically coupled to external light sources or sinks using grating couplers as the optical interfaces.

As mentioned above, the photonic chip 120A can also be used in the slave clock system. In that case, some of the optical components and waveguides in the chip 120A may be unused. In that embodiment, the slave comb 345 in FIG. 3 is connected to where the transfer comb 325 is shown in FIG. 4. As a result, the pulse train generated by the slave comb 345 is optically transmitted to the master clock system. The remaining circuitry would operate as described above except that no optical signal would be coupled to the optical port used by the master comb 305 in FIG. 4. As a result, the Y-splitters 420B, 420H, 420I, and 420J, and the filters 425C and 425E are unnecessary. Further, the PDs 430C and 430D may be omitted from the system since the slave clock system does not have a master comb 305. Of course, rather than re-using the design of the photonic chip 120A for the slave clock system, a different photonic chip design can be used where the Y-splitters, 420H, 420I, and 420J, and the filters 425C and 425E (and their accompanying waveguides) are omitted.

Figure 5:
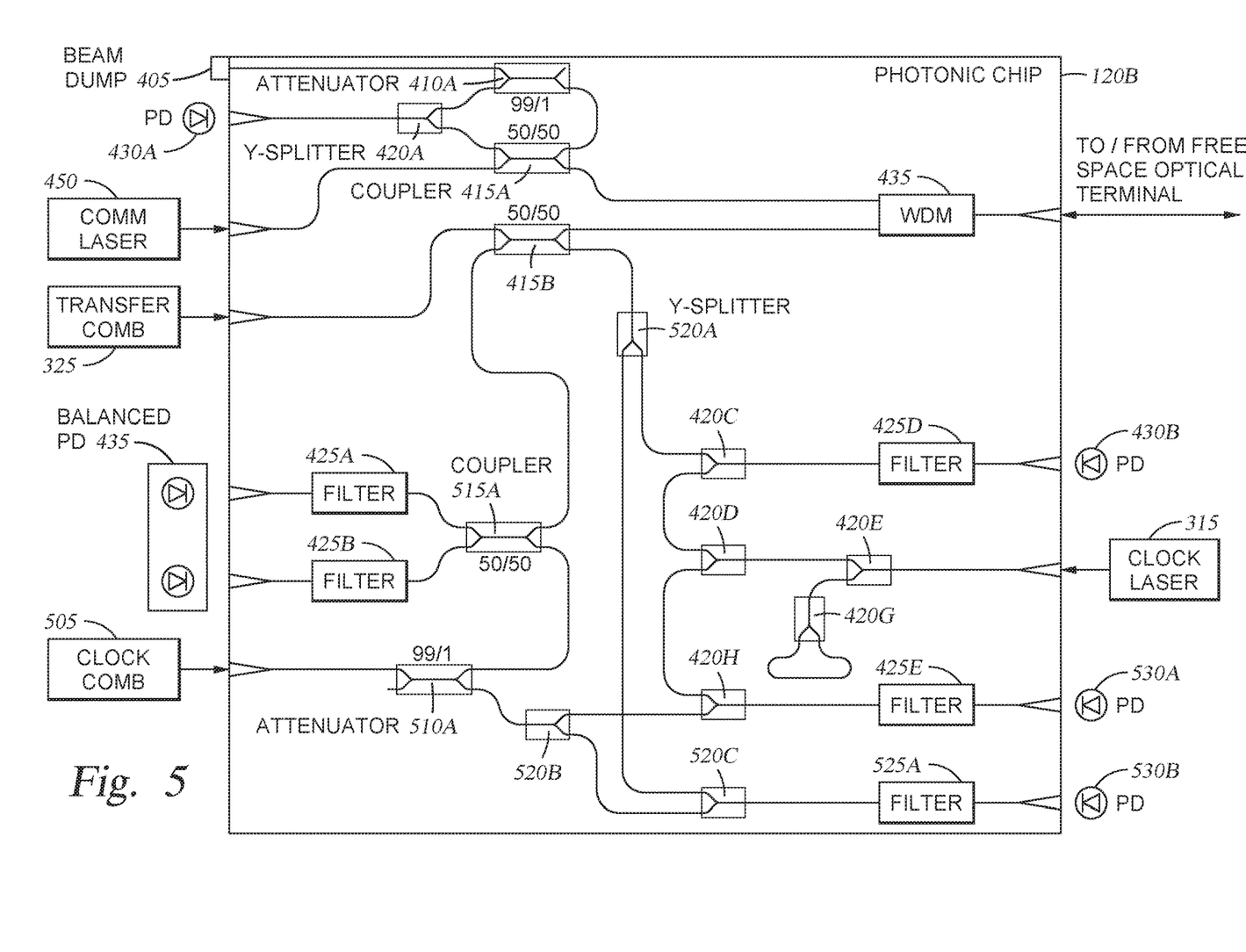
FIG. 5 is a photonic chip used in a two-way optical time transfer system, in one embodiment described herein.

FIG. 5 is a photonic chip 120B used in a two-way optical time transfer system, in one embodiment described herein. Rather than using the photonic chips in a master-slave system like that shown in FIG. 3, a different two-way time transfer system may have form a mesh network where there is no central master clock system. For example, a mesh network could include a space satellite constellation where each satellite can communicate with every other or some portion of the satellites and synchronize. There may be a master clock on the ground where, periodically, one of the satellites re-synchronizes with the ground site. Upon subsequent communications with other satellites, the latest timing update is disseminated from one satellite to the next.

There may be a variety of protocols to synchronize the clocks in a mesh network, with the simplest being comparison of last synchronization time between two nodes (or systems) in the mesh network and updating the one with the older synchronization time. In one embodiment, all nodes in the mesh network are identical and consequently contain a clock comb 505 (with identical repetition rates for each site) along with the transfer comb 325 (with identical repetition rate for each site). Since the local and received pulse trains must have slightly different repetition rates for optical downsampling to work as discussed above, the heterodyne architecture differs slightly from FIG. 4. In FIG. 5, the local pulse train generated by the transfer comb 325 is transmitted to a remote site (which is the same as in FIG. 4), but the pulse train received from the remote site (which was generated by the transfer comb in the remote site) is combined with pulses from a clock comb 505. Thus, each node receives the pulse train generated by the transfer combs 325 at the remote sites (which have all have a same first repetition rate) and combines those pulses with the pulses generated by the local clock comb 505 (where the clock combs in the nodes have a same second repetition rate that is slightly different than the first repetition rate).

The photonic chip 120B includes many of the same components as the photonic chip 120A where the same reference numbers are used to indicate commonalities between the two chip designs. These common components have the same functions (and alternative design choices, such as replacing 50/50 couplers with Y-splitters) as discussed above in FIG. 4, and thus, are not repeated here.

In the chip 120B, the transfer comb 325 generates the local pulse train which is transmitted to a remote node (or nodes) using the free space optical terminal. The free space optical terminal also receives a pulse train generated by a transfer comb 325 in another node in the mesh network. Thus, the pulse train generated by the transfer comb 325 which is transmitted by the optical terminal and the pulse train received at the optical terminal have the same repetition rate. The 50/50 coupler 415B forwards the received pulse train to a coupler 515A which combines this pulse train with a pulse train generated by the clock comb 505. Because the received pulse train and the pulse train generated by the clock comb 505 have different repetition rates, optical downsampling is performed as discussed above where the pulses walk through each other. After passing through the filters 425A and 425B, the balanced PD 435 captures a plurality of interference measurements which can then be used to synchronize the clocks in two nodes of the mesh network leveraging the techniques discussed above.

To prevent the pulses generated by the clock comb 505 from saturating the balanced PD 435, an attenuator 510A reduces the optical power of the output of the clock comb 505 before these pulses are combined with the received pulses. That is, 1% of the optical signal is combined with the received pulses while the remaining optical signal is forwarded to a Y-splitter 520B where the optical signal is again split. A Y-splitter 520C combines the pulses generated by the clock comb 505 with the pulses generated by the transfer comb 325 which are then filtered by a filter 525A and detected by a PD 530A. The electrical measurements captured by the PD 530A can then be used to synchronize the pulse train generated by the clock comb 505 with the pulse train generated by the transfer comb 325 (i.e., so their different repetition rates are maintained).

Further, the Y-splitter 520B transmits the pulses generated by the clock comb 505 to a Y-splitter 420H where they are combined with the optical signal generated by the clock laser 315. This combined optical signal is then filtered by the filter 425E and detected by the PD 530A to ensure synchronization between the clock comb 505 and the clock laser 315. In this manner, each of the nodes in the mesh network can include a photonic chip 120B for exchanging the pulses generated by the transfer comb 325 to synchronize high precision clocks in the nodes with sub-picosecond accuracy.

Like in FIG. 4, the Y-splitters 520A, 520B, and 520C introduced in FIG. 5 can be replaced with 50/50 couplers, or the 50/50 coupler 515A can be replaced by a Y-splitter.

The types of materials that are used in the photonic chips 120 in FIGS. 4 and 5 can vary. For example, the photonic chips 120 may be implemented using a variety of materials, ranging from silica to semiconductor materials such as silicon or an III-V semiconductor. The waveguide platform and associated waveguide in the chips 120 is an important consideration given that the pulses in the pulse trains have high peak powers and can drive optical nonlinearities in waveguides where the optical mode is tightly confined. In one embodiment, silica waveguides are used because they exhibit the lowest non-linearity among typical waveguide materials. In addition, due to relatively low index contrast between core and cladding, the waveguide dimensions are typically large compared to other materials. As a result, the optical mode is not highly confined, which reduces the peak intensities and consequently the undesired non-linearities. For example, a suitable silica waveguide may have an effective mode area of 4 microns in height and 3 microns in width for an optical signal containing 250 femtosecond pulses with 60 mW average power and with a propagation length of 25 mm. These silica waveguides may include silica cladding with a doped silica waveguide.

A potential downside of the silica platform is the relatively large footprint for the chips 120 due to mm bend radii required for silica waveguides. For smaller footprints, platforms with higher index contrast waveguides, such as silicon nitride (SiN), aluminum nitride (AlN), gallium arsenide (GaAs), or lithium niobate (LiNBO3) waveguides can be used. However, these waveguide core materials exhibit much higher optical nonlinearities than a silica waveguide which, along with tighter optical confinement, causes the pulse widths to increase—i.e., spreads out the pulse—which is undesirable. But the nonlinear behavior of these waveguides can be mitigated (or avoided) if the waveguide geometry is engineered so that most of the optical mode resides in the silica or air cladding (which have very small optical non-linearities) rather than being confined in the core. The size of the core, however, is wavelength specific; thus, the geometries needed to ensure that most of the light is contained in the cladding (i.e., the optical signal is weakly confined in the core) depends on the wavelength of the optical signal. For example, numerical simulations show that a SiN waveguide core embedded in silicon dioxide cladding can be 80 nm thick and two micron wide (or more generally, less than 150 nm thick and less than 3 microns wide) to weakly confine a 1550 nm wavelength optical signal. Launching 1 picosecond pulses with 60 mW average power leads to negligible pulse distortion for a total propagation length of 25 mm, in contrast to typical SiN waveguides with effective more area of 800 nm×500 nm, where these pulse conditions lead to pulse break up.

Moreover, the photonic chips are wavelength independent and can be implemented at any wavelength that is compatible with the optical network specifications and chip fabrication capabilities. Possible wavelengths are 830 nm, 1310 nm, 1550 nm, and 2000 nm.

Figure 6:
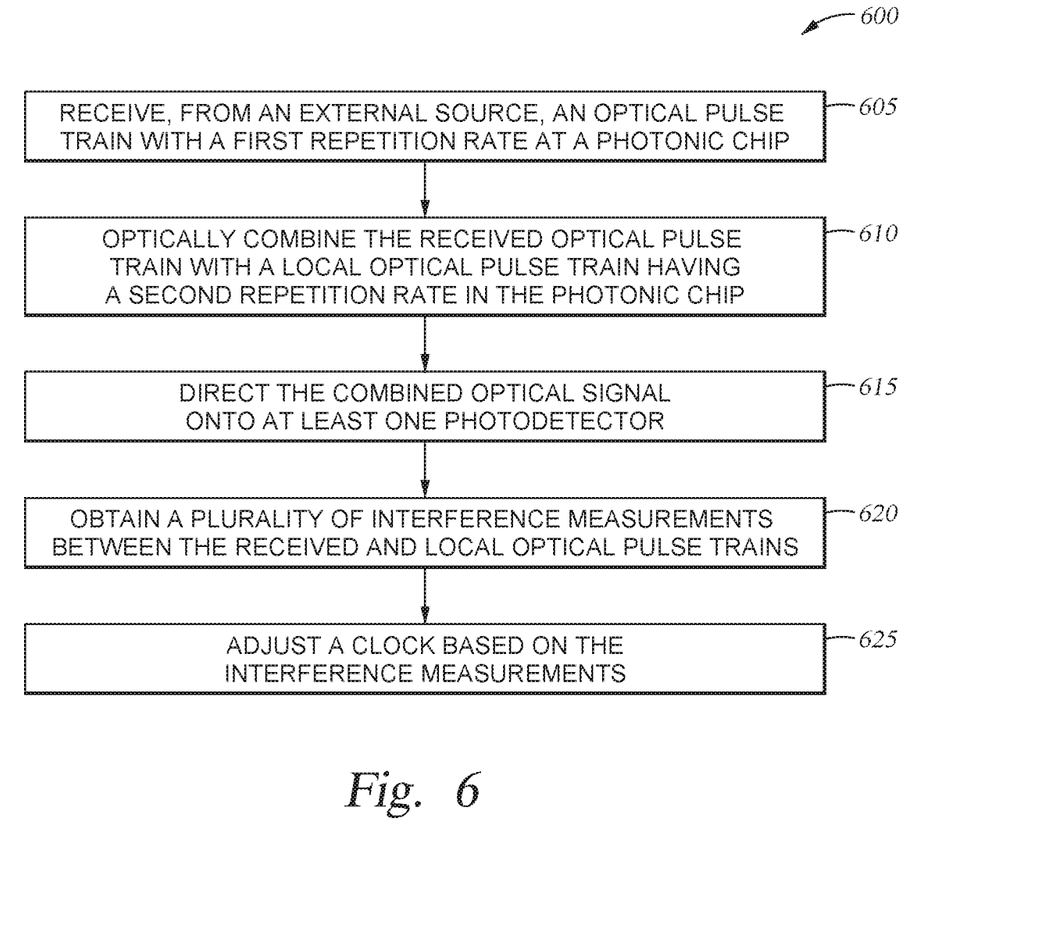
FIG. 6 is a flowchart for synchronizing remote clocks using optical pulse trains with different repetition rates, in one embodiment described herein.

FIG. 6 is a flowchart of a method 600 for synchronizing remote clocks using optical pulse trains with different repetition rates, in one embodiment described herein. At block 605, a photonic chip receives from an external source an optical pulse train with a first repetition rate. The external source may be a slave or master clock system as the case with FIGS. 3 and 4 or a different node in a mesh network as the case with FIG. 5.

At block 610, the photonic chip optically combines the received optical pulse train with a local optical pulse train having a second repetition rate. In one embodiment, combining the pulse train is performed using a 50/50 coupler or a Y-splitter (e.g., a Y-combiner) in the photonic chip. If a 50/50 coupler is used, the combined optical signal may be outputted into two waveguides, rather just a single waveguide if a Y-splitter is used.

At block 615, the photonic chip directs the combined optical signal onto at least one photodetector. In FIGS. 4 and 5, because a 50/50 coupler is used, the combined optical signal can be detected on two photodetectors in a balanced PD. However, in other embodiments, a single PD may be used.

At block 620, the clock system obtains a plurality of interference measurements between the received and local optical pulse trains. These interference measurements can be different data samples, where each data sample indicates a particular amount of interference between one pulse in the received pulse train and one pulse in the local pulse train (assuming the pulses at least partially overlap).

At block 625, the clock system adjusts a clock (e.g., a high precision clock such as an atomic clock) based on the interference measurements. For example, the clock system may capture thousands of individual interference measurements at block 620 before processing the data to identify a clock deviation. In that scenario, the system performs a tradeoff between the frequency at which synchronization is performed with improved accuracy.

In one embodiment, the adjustment to the clock occurs only after the two sites have communicated their respective measurements to each other. As discussed above, the difference of the measurements is used to isolate timing deviation from optical path length changes. If a clock deviation is identified, one or both of the clock systems adjust their high precision clocks.

Figure 7:
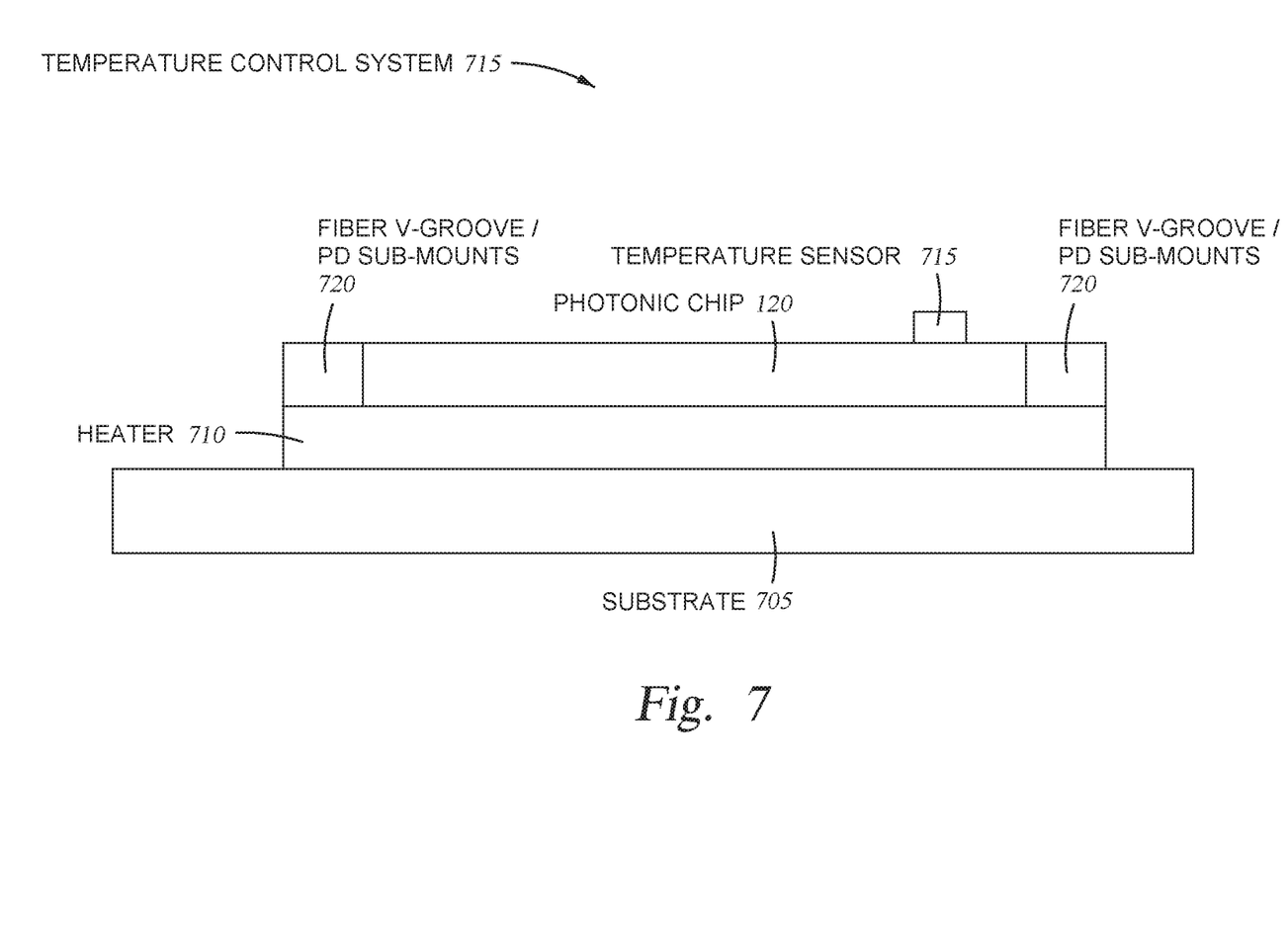
FIG. 7 illustrates a temperature control system for a photonic chip, in one embodiment described herein.

FIG. 7 illustrates a temperature control system 700 for a photonic chip 120, in one embodiment described herein. As mentioned above, the performance and accuracy of the optical functions performed by the photonic chip 120 may be affected by temperature. However, because the optical components used to perform these optical functions are implemented within the photonic chip 120 rather than using discrete components coupled by optical fiber, the temperature control system 700 can be much more compact and energy efficient.

The system 700 includes a substrate 705 on which a heater 710 is mounted. The substrate 705 can provide mechanical support for the substrate 705 as well as provide power and data control lines for operating the heater 710. The photonic chip 120 is mounted on a top surface of the heater 710 so that the heater 710 can control the internal temperature of the photonic chip 120. To do so, the system 700 also includes a temperature sensor 715 on the photonic chip 120. While FIG. 7 illustrates only one sensor 715, the system 700 may include multiple sensors attached to different locations of the chip 120.

The heater 710 can adjust the temperature of the photonic chip 120 based on the temperature measured by the sensor 715. For example, the clock system in which the temperature control system 700 is included may be exposed to different environment conditions which can affect the internal temperature of the chip 120. In another embodiment, the system 700 is surrounded by electronics or other heat generating sources that affect the temperature of the chip 120. Using the temperature sensor 715 and the heater 710, the system 700 can ensure the internal temperature of the chip 120 is maintained at an optimal operation temperature.

FIG. 7 also illustrates fiber V-groove and PD sub-mounts 720 at the sides of the photonic chip 120. These V-grooves couple optical sources to the photonic chip 120 so that optical signals can be received by the photonic chip 120 (e.g., the transfer, slave, clock combs discussed above) as well as permit the photonic chip 120 to transmit optical signals to external sources (e.g., other clock systems). The PD sub-mounts align PDs to the photonic chip 120 so these PDs can detect the combined optical signals generated within the photonic chip 120.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A photonic chip comprising:
   a first optical interface for receiving a first pulse train from an external source, wherein the external source comprises a remote clock, wherein pulses in the first pulse train have a first repetition rate;
   a second optical interface configured to receive a second pulse train having pulses with a second repetition rate different from the first repetition rate;
   a first optical combiner coupled to the first optical interface and the second optical interface, wherein the first optical combiner is configured to combine the first pulse train and the second pulse train into a combined optical signal; and
   a third optical interface configured to output the combined optical signal onto a photodetector to generate interference measurements between pulses in the first and second pulse trains for synchronizing a local clock to the remote clock.

2. The photonic chip of claim 1, wherein the first optical interface is coupled to the second optical interface such that the second pulse train is transmitted to the external source via the first optical interface.

3. The photonic chip of claim 1, further comprising:
   an attenuator coupled between the first optical combiner and the second optical interface to reduce the optical power of the second pulse train before the second pulse train is combined with the first pulse train.

4. The photonic chip of claim 3, further comprising:
   a second optical combiner coupled between the attenuator and the second optical interface, and between the first optical interface and the first optical combiner.

5. The photonic chip of claim 1, wherein the first optical combiner comprises a 50/50 coupler, wherein the photonic chip comprises:
   a first optical filter coupled to a first output of the 50/50 coupler; and
   a second optical filter coupled to a second output of the 50/50 coupler.

6. The photonic chip of claim 5, further comprising:
   a fourth optical interface coupled to the first optical filter, and configured to output a first portion of the combined optical signal to the photodetector; and
   a fifth optical interface coupled to the second optical filter, and configured to output a second portion of the combined optical signal to a different photodetector.

7. The photonic chip of claim 1, further comprising:
   a fourth optical interface configured to receive a third pulse train having pulses with the first repetition rate; and
   a second optical combiner coupled between the fourth optical interface and the first optical interface such that the third pulse train is transmitted to the external source via the first optical interface, wherein the second optical combiner is configured to forward the first pulse train to the first optical combiner.

8. The photonic chip of claim 1, further comprising:
   a wavelength division multiplexer (WDM) coupled between the first optical interface and the first optical combiner, wherein the WDM is configured to separate the first pulse train from a first coarse communication optical signal also received at the first optical interface, wherein the first coarse communication optical signal includes information for performing a coarse synchronization between the local and remote clocks.

9. The photonic chip of claim 8, further comprising:
   a second optical combiner coupled to the WDM;
   a fourth optical interface coupled to the second optical combiner, wherein the fourth optical interface is configured to a receive a second coarse communication optical signal;
   an attenuator coupled to the second optical combiner for attenuating a portion of the second coarse communication optical signal; and
   a third optical combiner coupled to the second optical combiner, the attenuator, and a fifth optical interface, wherein the fifth optical interface is configured to interface with a photodiode for detecting a combination of the first and second coarse communication optical signals.

10. The photonic chip of claim 1, further comprising:
    a fourth optical interface configured to receive a third pulse train having pulses with the first repetition rate;
    second optical combiner configured to combine the second and third pulse trains; and
    a fifth optical interface configured to output the combined second and third pulse trains onto a second photodetector.

11. The photonic chip of claim 10, further comprising:
    a sixth optical interface configured to receive a clock optical signal corresponding to the local clock;
    a third optical combiner configured to combine the clock optical signal with the second pulse train;
    a seventh optical interface configured to output the combined clock optical signal and second pulse train onto a third photodetector;
    a fourth optical combiner configured to combine the clock optical signal with the third pulse train; and
    an eighth optical interface configured to output the combined clock optical signal and the third pulse train onto a fourth photodetector.

12. The photonic chip of claim 1, wherein the photonic chip comprises waveguides having cores formed from an optically non-linear material, where the optical power of the first and second pulse trains is weakly confined in cores of the waveguides such that most of the optical power is located in cladding of the waveguides.

13. The photonic chip of claim 12, wherein the optically non-linear material comprises at least one of silicon nitride (SiN), aluminum nitride (AlN), gallium arsenide (GaAs), or lithium niobate (LiNBO3).

14. A method, comprising:
    receiving, at a photonic chip, a first pulse train from an external source, wherein the external source comprises a remote clock, wherein pulses in the first pulse train have a first repetition rate;
    receiving, at the photonic chip, a second pulse train having pulses with a second repetition rate different from the first repetition rate;
    optically combining the first pulse train and the second pulse train into a combined optical signal in the photonic chip; and
    outputting the combined optical signal onto a photodetector to generate interference measurements between pulses in the first and second pulse trains for synchronizing a local clock to the remote clock.

15. The method of claim 14, further comprising:
    transmitting the second pulse train to the external source.

16. The method of claim 14, further comprising:
    attenuating the optical power of the second pulse train before the second pulse train is combined with the first pulse train.

17. The method of claim 14, further comprising:
receiving, at the photonic chip, a third pulse train having pulses with the first repetition rate; and
transmitting the third pulse train to the external source.

18. The method of claim 14, further comprising:
receiving a coarse communication optical signal in parallel with receiving the first pulse train, wherein the coarse communication optical signal includes information for performing a coarse synchronization between the local and remote clocks; and
separating, in the photonic chip, the coarse communication optical signal from the first pulse train using a WDM.

19. A clock system, comprising:
a first clock;
a pulsed optical source configured to generate a first pulse train with pulses having a first repetition rate; and
a photonic chip optically coupled to the pulsed optical source, wherein the photonic chip is configured to receive and combine the first pulse train with a second pulse train received from an external clock system in order to synchronize the first clock with a second clock in the external clock system, wherein the second pulse train has pulses with a second repetition rate different from the first repetition rate.

20. The clock system of claim 19, wherein the first and second clocks comprise atomic clocks.

21. The clock system of claim 19, wherein the first and second clocks are synchronized with better than a picosecond of accuracy.

* * * * *